United States Patent [19]

Wöste

[11] 4,403,324

[45] Sep. 6, 1983

[54] DYE LASER HAVING A DYE JET NOZZLE WHICH FORMS A WELL-DEFINED DYE STREAM, AND ITS METHOD OF MANUFACTURE

[75] Inventor: Ludger H. Wöste, Ecublens, Switzerland

[73] Assignee: Lexel Corporation, Palo Alto, Calif.

[21] Appl. No.: 266,989

[22] Filed: May 26, 1981

[51] Int. Cl.³ ................................................ H01S 3/20
[52] U.S. Cl. ........................................ 372/54; 372/51; 372/53
[58] Field of Search ........................... 372/53, 151, 54; 239/555

Primary Examiner—William L. Sikes
Assistant Examiner—Léon Scott, Jr.
Attorney, Agent, or Firm—C. Michael Zimmerman

[57] ABSTRACT

A dye laser having an improved dye jet nozzle and its method of manufacture is described. The exit aperture of the nozzle is provided by a nozzle end assembly made up of a plurality of blocks of material which are in optical contact with one another. The liquid channel defined by the blocks is provided with optically flat surfaces which minimize interference with uniform liquid flow therethrough. Moreover, edges are provided for the exit aperture defined by the blocks by polishing the same while they are supported, so that the resulting edges have a minimum of imperfections.

21 Claims, 8 Drawing Figures

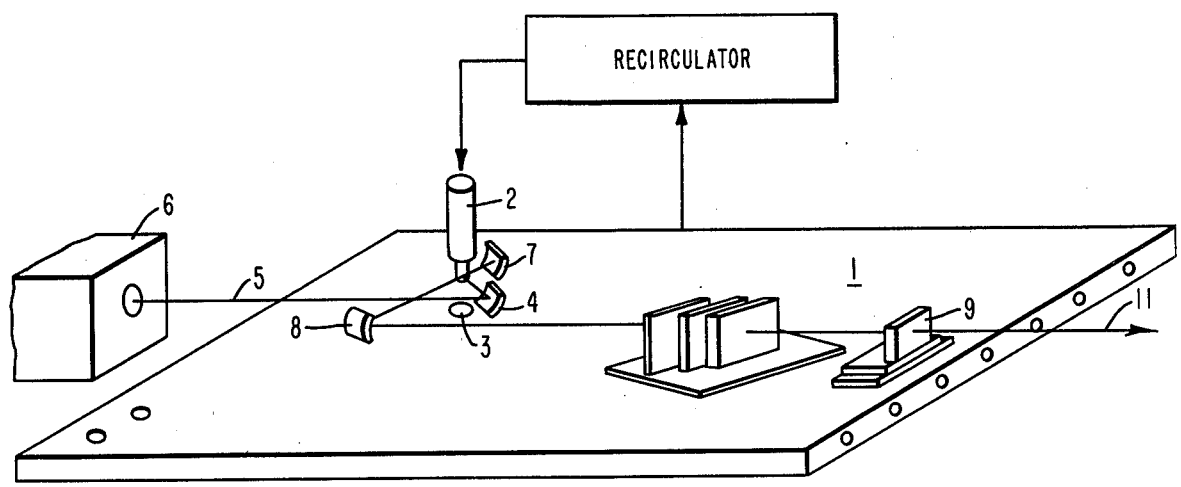
FIG_1
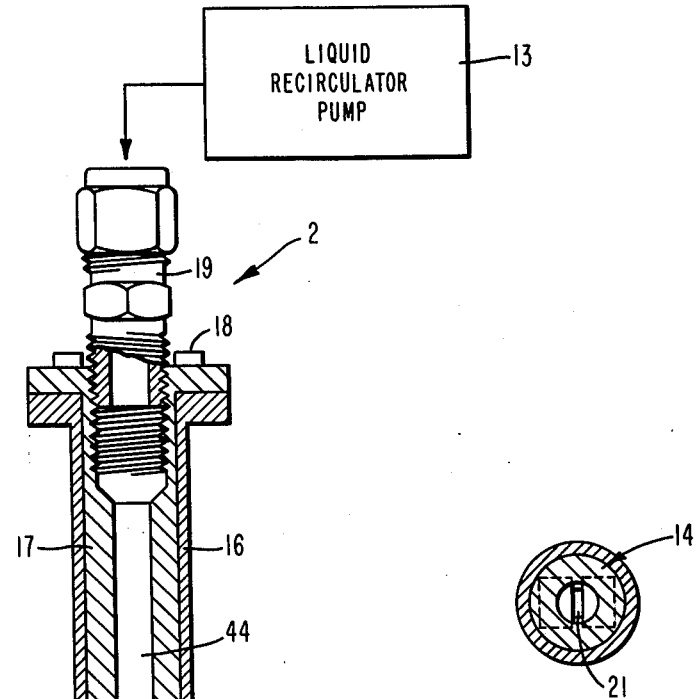
FIG_2
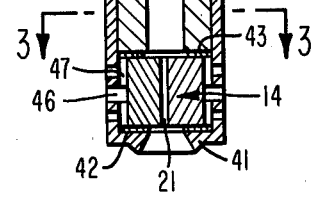
FIG_3

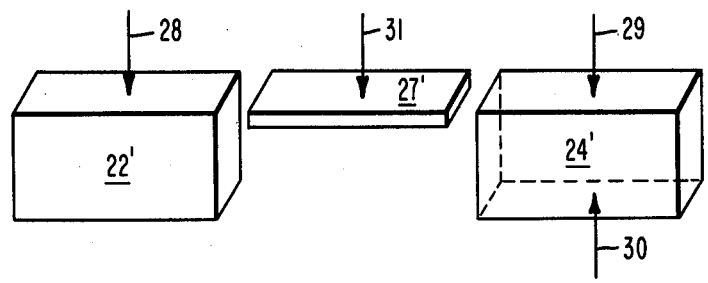
FIG_4
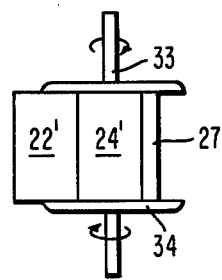
FIG_5
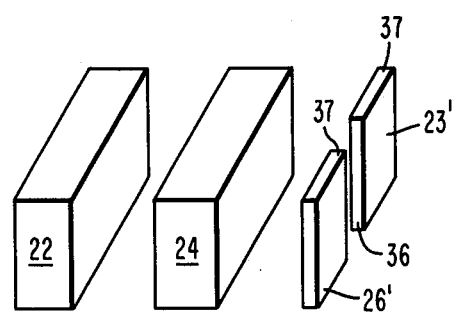
FIG_6
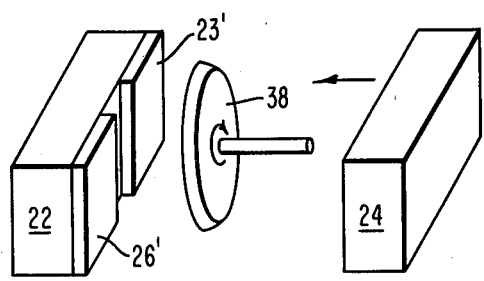
FIG_7
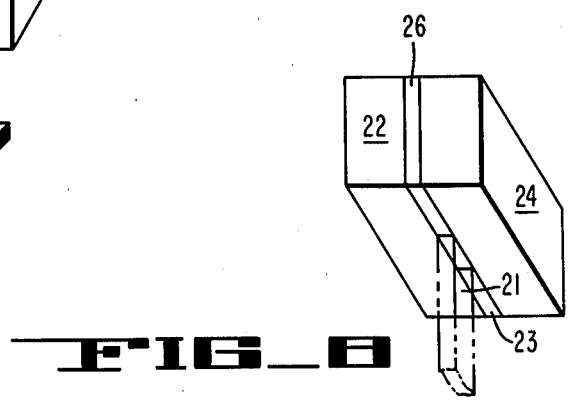
FIG_8

DYE LASER HAVING A DYE JET NOZZLE WHICH FORMS A WELL-DEFINED DYE STREAM, AND ITS METHOD OF MANUFACTURE

BACKGROUND OF THE INVENTION

The present invention relates to a dye laser having an improved dye jet nozzle for forming a free jet stream of a liquid, and a method of manufacturing such a nozzle. More particularly, the invention relates to a dye laser (and its method of manufacture) having a nozzle especially designed to provide a free jet stream of dye which will maintain a desired configuration with a minimum of surface thickness fluctuations and variations in its velocity profile.

As used herein, the terminology "free jet stream of dye" means a stream of liquid dye which flows unconfined (free) from a supply under pressure. Such a dye stream typically is formed in a dye laser by a nozzle which imparts to the dye prior to the time the same flows into an ambient atmosphere, a desired configuration, etc.

It is important in dye lasers employing a free jet stream of dye that the same maintain uniform characteristics for a time after it leaves the dye jet nozzle, over that portion of its cross sectional configuration impinged by pumping radiation. The present invention is directed to a dye laser having a nozzle for forming such a stream designed to assure that the interface between the liquid dye and the solid components of the nozzle do not interfere with such dye maintaining its integrity for a related portion of its free path after flowing from such nozzle.

SUMMARY OF THE INVENTION

The present invention provides a dye laser which includes a dye jet nozzle having a sharp edge at its exit aperture that has minimum imperfections to interact with liquid dye flowing outwardly of the nozzle at such edge. This is accomplished by forming the exit aperture edge of the nozzle in a particular way. That is, such edge is provided by the intersection of a pair of faces of a block of material, and is formed by first positioning such block against a supporting block with one of its faces generally coplanar with a corresponding face of the supporting block and the edge in contact with the supporting block. The coplanar faces of the two blocks thereafter are simultaneously polished (material is removed from the same) while the edge is overlapped so that the edge is fully supported during such polishing to become the desired sharp edge. Most desirably, the supporting block is itself a block of material having first and second faces which intersect to define an edge intended to provide another edge for the nozzle exit aperture, so that such overlapped polishing provides two separate edges for the exit aperture having a minimum of imperfections.

Provision of optically flat side wall surfaces for the dye channel in the nozzle immediately adjacent the exit aperture, is also comprehended as part of the invention. This assures that such side walls do not introduce unwanted perturbations in the dye stream. Moreover, the nozzle channel is defined by a plurality of blocks of material with the result that prior to assembly of the nozzle, access can be had easily to the channel side wall surfaces and the exit aperture edges for conditioning as discussed above. When the nozzle is assembled, these blocks are placed in optical contact with one another as discussed infra, at all points of their engagement exposed to flowing dye. Thus, the block interfaces exposed to the liquid only introduce minimum perturbations in the liquid stream.

The invention includes other features and advantages which will be described or will become apparent from the following, more detailed description of preferred embodiments.

BRIEF DESCRIPTION OF THE DRAWINGS

With reference to the accompanying single sheet of drawing:

FIG. 1 is a schematic, isometric view of a preferred embodiment of the invention;

FIG. 2 is an elevational view of the nozzle of the preferred embodiment of the invention of FIG. 1, shown partly in section and partly in schematic;

FIG. 3 is an elarged, sectional view of the end of the nozzle of FIG. 2, taken on a plane indicated by the lines 3—3 in FIG. 2;

FIG. 4 is a schematic illustration of blocks of material from which the nozzle end is formed;

FIGS. 5–7 illustrate schematically, sequential steps of the process for forming the nozzle end; and FIG. 8 schematically illustrates in operation a finished assembly of the parts defining the exit aperture of the nozzle.

DETAILED DESCRIPTION OF THE PREFERRED EMBODIMENTS

FIG. 1 schematically illustrates a preferred embodiment of a dye laser of the invention. It includes an optical resonator structure in the form of a base plate 1 as shown, upon which are mounted the typical mechanisms and optics of a basic linear dye laser. More particularly, means are included for furnishing a liquid dye capable of lasing to a selected location contiguous to the base plate. In this preferred embodiment, such means takes the form of a nozzle 2 which directs a free-flowing jet stream of a dye through the selected location. The dye stream then flows through an aperture, represented at 3, in the base plate, to be collected and fed to a recirculator 4 for recirculation through nozzle 2.

Means are also provided on base plate 1 for focusing to the selected location, a beam of pumping radiation capable of creating a population inversion in the dye. To this end a focusing mirror 4 is positioned to reflect a beam 5 of coherent radiation to its focal point, positioned at the selected location on the dye stream. Beam 5 is emitted by a gas ion laser, partially shown at 6.

As is known, impingement of a focused beam of coherent radiation on a well defined stream of a selected dye, can result in the dye fluorescing. And the optical radiaton emitted from the same can be made to lase by the positioning of optical reflectors to cause appropriate feedback of stimulated emission of optical radiation. In this connection, a pair of optical reflectors or mirrors 7 and 8 are mounted on the base plate respectively on opposite sides of the selected location to reflect optical radiation emitted by the liquid dye. Reflectors 7 and 8 are totally reflective, i.e., they reflect essentially all optical radiation having the appropriate wavelength, impinging upon the same. While reflector 7 is oriented to return to reflector 8 any radiation which impinges upon the same, reflector 8 is oriented to direct radiation which impinges on the same toward another optical reflector represented at 9. Reflector 9 is partially transmissive to provide a dye laser output beam 11.

It will be apparent to those skilled in the art, that the mirrors 7, 8, and 9 define a two-legged, optical cavity of a linear dye laser. That is, such mirrors provide continual, resonant passage through the fluorescing portion of the dye stream, of optical radiation emitted by such dye stream to cause lasing.

FIG. 2 is an enlarged sectional view of nozzle 2. It is designed to project a jet of a liquid dye which will be rectangular in cross section and have a uniform, well defined thickness between two opposed faces. Moreover, it is designed to assure that minimum mechanical imperfections or the like are present in the nozzle to perturb either the uniformity or velocity of the liquid dye. It is the end assembly 14 of nozzle 2 which defines the emitted jet stream. The remainder of the nozzle is included to deliver dye for forming the jet stream to the end 14 and provide in a very general way, some definition to the stream. An outer casing or cylinder 16 is provided within which an insert 17 is maintained by a plurality of cap screws 18. A liquid hose coupling 19 is threadably received within insert 17, and acts to connect the remainder of the nozzle to a hose provided with dye under pressure.

As mentioned previously, it is the exit end assembly 14 of nozzle 11 which is responsible for the final configuration and characteristics of the free jet stream of dye. A liquid channel 21 for forming the jet stream (FIG. 3) is defined in such end by a plurality of blocks 22, 23, 24, and 26. As will be discussed below, blocks 23 and 26 are formed by slicing through a larger block, and thus are sometimes referred to herein as "block parts," rather than full "blocks."

In keeping with the invention, the blocks 22–24 and 26 define both the liquid channel 21 and the ultimate exit aperture for the dye stream in a manner which will prevent that portion of the nozzle structure engaged with the stream immediately before it enters the ambient atmosphere, from interfering with the configuration and velocity profile of the dye stream exiting such nozzle. In this connection, it is first important to note that the channel 21 is therefore made up of a plurality of parts which assure that simple access can be had to the channel side walls and the exit aperture edges for appropriate conditioning, before the nozzle is assembled.

The characteristics of the material from which the blocks 22–24 and 26 are made, are particularly important for the preferred arrangement. First of all, the material should be one which can be polished on a surface to be optically flat. The term "optically flat surface" is generally known in the trade. In qualitative terms, such a surface is one which is sufficiently flat to form an optical contact (as that term is defined hereinafter with another "optically flat" surface produced independently of the first surface. Most desirably, for the purposes of the instant invention, an optically flat surface is one that has no variations from a mean flat plane, greater than about 0.135 microns.

For example, the fused silica sold by Heraus-Amersil, Inc. of Sayreville, N.J., with the designation T08 Commercial has this capability.

In the manufacture of nozzle end 14, three rectangular blocks of material from which the blocks 22, 23, 24 and 26 are to be made are first furnished. The blocks from which blocks 22 and 24 are to be made are provided with slightly larger dimensions that it is intended the finished blocks have in the final nozzle end assembly, to permit subsequent polishing as described. In one embodiment, the finished blocks in the final end assembly are 5.43 by 11.20 mm with a height of 15.0 mm. The unfinished blocks of material are respectively referred to in the drawings by the primed reference numerals 22' and 24'. Such blocks 22' and 24' are each cut and ground to provide a solid rectangle, and it is preferred that the sides of each (the larger faces) be provided with an optical quality finish.

Blocks 23 and 26 are actually formed as block parts by slicing a third block of material. This third block of material is represented in FIGS. 4 and 5, and denoted by the reference numeral 27. It is also rectangular and if the finished blocks 22 and 24 have the dimensions set forth above, it desirably is large enough to have a finished thickness of 0.35 mm and a finished height of 15.0 mm.

It will be noted that in the final nozzle assembly, two opposed faces of blocks 22 and 24 define the broad side wall surfaces of the liquid channel. In keeping with the invention, the block faces which are to provide such side wall surfaces should be polished to be optically flat as defined above. FIG. 4 schematically illustrates such polishing. The arrows 28 and 29 refer to the surfaces which are polished to be optically flat. As illustrated, the opposite surface of one of the blocks (block 24' in FIG. 4) is also polished to be optically flat. This is indicated by arrow 30. Moreover, one of the broad faces of block 27 is also polished to be optically flat, as denoted by arrow 31.

The surfaces of the blocks 22' and 24' which are to be polished to optically flat surfaces, are polished sufficiently to make the thickness of each of such blocks below the polished surfaces equal to the final dimension desired when such blocks are assembled with the remainder of the nozzle components. However, block 27 should have enough extra thickness after the polishing represented by arrow 31 to allow the opposite surface also to be polished optically flat as discussed below.

After the surfaces designated by the arrows 28–31 are made optically flat, the three blocks are assembled together with such surfaces optically contacting one another. That is, such surfaces are cleaned, the surface designated by the arrow 28 of block 22' is intimately engaged with one of the surfaces designated by the arrows 29 and 30 of the block 24', and the surface designated by the arrow 31 of block 30 is brought into intimate contact with the other optically flat surface of block 24'. As is known, intimate engagement of clean, optically flat surfaces with one another will result in a bond at the surface interface. This bond is due to molecular adhesion between the materials of the two surfaces in intimate engagement. Such an intimate engagement between surfaces is referred to in the art and herein as an "optical contact" therebetween.

As schematically represented in FIG. 5, the blocks 22', 24' and 31 are placed in optical contact with one another with their upper and lower surfaces or faces generally coplanar. As one of the more particularly salient features of the instant invention, the end faces of the blocks 22', 24' and 31 are then polished. This polishing operation is represented in FIG. 5 by the schematic representation of circular polishing pads 33 and 34. It is important to note that such polishing is accomplished overlapping the interfacing edges of the blocks. Each of such edges is in contact with the adjacent block and thus is fully supported along its length during the polishing operation. Some of these block edges form the edges of the jet exit aperture when the blocks are assembled together. Because such edges are fully supported during such polishing or, in other words, material removal, they will each have a minimum of imperfections. That is, such edges will be free of detrimental depressions and discontinuities.

The optical contact during polishing between the faces of the blocks providing such edges, enhances the edge conditioning. More particularly, such optical contact will assure that each of the polished block edges will be in engagement and supported by the adjacent block with an outside tolerance of at the most the sum of the most significant depth variations in each block.

It should be noted that it is not necessary to polish the ends of the blocks optically flat. It is only necessary that such blocks receive at such faces a quality optical polish. That is, such faces need not necessarily be polished to optical flatness in order to obtain the effects of the invention. It should be further noted that this polishing operation provides a plurality of edges for the exit aperture at one time. That is, the blocks 22' and 24' each provide one of the longer edges for the exit aperture. It is not necessary in obtaining the sharp exit aperture edges discussed above that both opposed end faces of the blocks be polished. It is desirable, though, for another reason. That is, it is desirable in the finished nozzle that for sealing purposes all of the blocks be of the same length. The polishing of opposed end faces of the blocks will assure that a common length is achieved. And it is to be noted that it is only for this reason that block 31 is assembled with the blocks 22' and 24' during such polishing.

After the end faces of the blocks are polished as discussed above, the blocks are separated from one another as schematically represented in FIG. 5. Moreover, the block 31 is sliced to define a pair of block parts 23' and 26'. (The use of primed reference numerals denotes that such block parts do not yet have their final dimensions.) It is a narrow side wall of each of the block parts 23 and 26 which form the end side wall faces of the liquid channel. Such faces should be polished to a desired sheen. Such polishing most simply can be accomplished by sandwiching a plurality of such block parts together to provide a workable surface, leaving exposed on opposite sides, the surfaces 36 and 37 of each. Such surfaces are then polished to the desired finish. It is not necessary for the use to which the particular nozzle being described is to be placed, that the narrower ends of the jet stream maintain their integrity. Thus, for this particular embodiment, the surfaces 36 and 37 need not be polished optically flat. However, they should be polished to provide the individual block parts with a dimension between the opposed surfaces of 4.50 mm.

After the surfaces 36 and 37 of the block parts 23' and 26' are suitably polished, such blocks are assembled with the block 22 to begin defining the liquid channel. In this connection, it is to be recalled that one face of each of the blocks 23' and 26' has an optically flat finish. The optically flat surface of each is placed into optical contact with the optically flat surfaces of block 22.

The block parts are suitably spaced apart from one another a distance equal to the desired width of the final channel. Moreover, care should be taken when they are so assembled to assure that the end faces of the blocks 23 and 26 are aligned with the corresponding end faces of block 22.

FIG. 7 schematically illustrates the block parts 23' and 26' positioned against the optically flat face of block 22 as described. After they have been so positioned, the exposed side of blocks 23' and 26' are then polished optically flat. This is represented in FIG. 7 by the showing of polishing head 38. Once they are optically flat, the conditioning of such block parts is finished and the block 24 can be brought into engagement therewith with its end annulus for the nozzle which flares outwardly away from the exit aperture of the channel 21 to assure that flange 41 will not interfere with the integrity of the liquid stream.

A spacer ring 42 is placed within the housing 16 adjacent its end. The nozzle end assembly 14 is then inserted within such housing to rest on such spacer ring. In this connection, it is important for this particular embodiment that the blocks 22–24 and 26 have the same length and be coextensive with one another so that their ends abutting against spacer ring 42 are coplanar. A second spacer ring 43 is then inserted on the nozzle end assembly to isolate the same from the remainder of the structure. The spacer rings 42 and 43 can be of teflon, and act as a seal to prevent liquid, particularly liquid under pressure in insert channel 44, from seeping around nozzle end assembly 14.

Insert 17 is inserted within the housing after spacer ring 43 is placed into position, and cap screws 18 are threadably received within the housing to maintain such insert in place. Coupling 19 can then be threadably received within the insert.

A pair of set screws 46 which may be of nylon or other soft material, are threadably received within the housing 16 adjacent the nozzle end assembly 14 at locations opposite one another about the periphery of such housing. As illustrated, the ends of such set screws engage the nozzle end assembly. They are provided to enable shifting of the position of such assembly within the housing as desired to obtain a selected alignment of the channel 21 relative to the remainder of the structure. The space between the nozzle end assembly and the housing can then be filled with a potting compound as represented at 47 to fill all volume at the nozzle end except for that defined by the liquid channel.

Although the invention has been described in connection with preferred embodiments thereof, it will be appreciated by those skilled in the art that various changes and modifications can be made without departing from its spirit. Moreover, several aspects of the same can be used advantageously independently of the others. For example, in some instances optically flat channel side walls can be advantageously employed irrespective of whether or not the edges of the liquid exit aperture are conditioned as described. It is therefore intended that the coverage afforded applicant be limited only by the claims and their equivalent language.

I claim:

1. In a process of forming a dye laser and manufacturing a dye jet nozzle therefore, the steps of:
    A. furnishing an optical resonator structure for a dye laser;
    B. furnishing means for providing at a selected location contiguous to said optical resonator structure, a liquid dye capable of lasing;
    C. furnishing means for focusing to said selected location, a beam of pumping radiation capable of creating a population inversion in said dye; and
    D. furnishing a means mounted on a first base plate positioning a pair of optical reflectors respectively on opposite sides of said location to reflect optical radiation emitted by said liquid dye; said step of furnishing means for providing a liquid dye at said selected location including the steps of;

a. furnishing a first block of material having an edge defined by the intersection of first and second faces of said block, for forming a portion of the exit aperture of said nozzle;

b. positioning said first block of material against a supporting block with said first face thereof generally coplanar with a corresponding first face of said supporting block and said edge in contact with said supporting block; and c. simultaneously removing material from said first face and said corresponding first face of said supporting block while overlapping said edge whereby said edge is fully supported during said removal to become a sharp edge having a minimum of imperfections.

2. A process according to claim 1 wherein said second face of said block of material provides a sidewall surface of a channel for the flow of liquid outwardly of said nozzle past said edge to form said free jet stream.

3. A process according to claim 1 wherein said block of material is positioned against said supporting block with said second face of said first block in optical contact with a corresponding second face of said supporting block; and further including prior to said positioning the step of polishing said second faces of said block and said supporting block to make the same optically flat.

4. A process according to claim 1 wherein said exit aperture is formed at least partially by the edges defined by the respective intersections of first and second faces of at least two separate blocks of material, one of which is said first block and the other of which is said supporting block being said intersecting first face thereof, whereby two edges for said exit aperture are formed by the simultaneous removal of material from said first faces; further including the steps of:

A. separating said first faces of said blocks from one another after said simultaneous removal of material therefrom; and B. thereafter positioning said edges of said blocks of material spaced apart from one another to define edges of said exit aperture.

5. A process according to claim 4 wherein said exit aperture is also formed by the edge defined by the intersection of a first and second face of a third block of material, further including the steps of:

A. positioning said third block of material against said supporting block with said first face of said third block generally coplanar with said corresponding first face of said supporting block and said edge of said third block in contact with said supporting block; and B. also simultaneously removing material from said first face of said third block and said corresponding face of said supporting block while overlapping said edge of said third block whereby said edge is also fully supported during said removal to become a sharp edge having a minimum of imperfections.

6. A process according to claim 5 further including the steps of:

A. slicing said third block of material through said edge into two block parts; and B. thereafter positioning said edges of the resulting block parts spaced apart from one another to form opposed edges of said exit aperture.

7. A process according to claim 6 wherein said step of positioning said edges of said blocks of material spaced apart from one another includes the steps of:

A. polishing to an optically flat finish a face of each block adjacent the exit aperture edge to be defined by said block; and B. optically contacting the polished faces of adjacent blocks defining adjacent edges of said exit aperture to assure intimate engagement between said blocks.

8. A process according to claim 6 further including the steps of:

A. polishing to an optical contact finish a third face of each of said block parts which is to oppose said polished face of said first block of material after the formation of said exit aperture; and B. optically contacting the polished faces of said block parts with said optically polished face of said first block of material to form said opposed edges of said exit aperture.

9. A process according to claim 8 further including the steps of;

A. polishing said second face of said supporting block to an optically flat finish;

B. after said optically polished faces of said two block parts are intimately engaged with said optically flat second face of said first block, polishing the opposite faces of said two block parts to optically flat finishes; and C. thereafter optically contacting said opposite faces of said two block parts with said second face of said supporting block to form said exit aperture.

10. A dye laser comprising;

A. an optical resonator structure;

B. means for providing at a selected location contiguous to said structure, a liquid dye capable of lasing, which means includes a nozzle for receiving a lasable liquid dye under pressure and forming a free jet stream therefrom, comprising at least two blocks of material, each of which has a first face providing a side wall surface of a channel for the flow of said liquid dye outwardly of said nozzle to form said stream and a second face intersecting said first face in optical contact with the corresponding second face of the other block;

C. means for focusing to said selected location, a beam of pumping radiation capable of creating a population inversion in said dye; and D. means mounted on said optical resonator structure positioning a pair of optical reflectors respectively on opposite sides of said location to reflect optical radiation emitted by said liquid dye.

11. A dye laser according to claim 10 wherein said nozzle further includes a third block having a first face providing another side wall surface of a channel for the flow of said liquid outwardly of said nozzle to form said stream, which first face is provided with an optically flat finish and is opposed in spaced apart relationship to a first face of one of said other blocks of material also having an optically flat finish.

12. A dye laser according to claim 10 wherein an edge forming a portion of the exit aperture of said nozzle is provided by the intersection of said first face of each of said blocks with another face thereof, each of which edges is conditioned prior to assembly of said blocks to form said exit aperture with reduced edge imperfections.

13. A dye laser according to claim 10 wherein said nozzle comprises at least four of said blocks of material which individually have a first face providing a side wall surface of a channel for the flow of said liquid outwardly of said nozzle to form said stream, and a second face intersecting said first face having an optically flat finish, which four blocks are assembled adjacent one another to define a rectangular exit aperture with each of said second faces thereof in optical contact with a corresponding second face of an adjacent block.

14. A dye laser comprising;
  A. an optical resonator structure;
  B. means for providing a liquid dye capable of lasing at a selected location contiguous to said structure, which means includes a nozzle for receiving a lasable liquid dye under pressure and forming a free jet stream therefrom, and having an exit aperture at least partially formed by an edge of a first block of material defined by the intersection of first and second faces of said block, conditioned to having a minimum of imperfections by:
     a. positioning said first block against a support block with said first face thereof generally coplanar with a corresponding first face of said supporting block and said edge in contact with said supporting block; and
     b. simultaneously removing material from said first face of said block and said corresponding first face of said supporting block while overlapping said edge whereby said edge is fully supporting during said removal;
  C. means for focusing to said selected location, a beam of pumping radiation capable of creating a population inversion in said dye; and
  D. means mounted on said optical resonator structure positioning a pair of optical reflectors respectively on opposite sides of said location to reflect optical radiation emitted by said liquid dye.

15. A dye laser according to claim 14 wherein said exit aperture of said nozzle is formed by the edges defined by the respective intersections of first and second faces of at least two blocks of material, one of which is said first block and the other of which is said supporting block with said corresponding first face of said supporting block being said intersecting first face thereof, whereby two edges for said exit aperture are formed by the simultaneous removal of material from said first faces.

16. A nozzle according to claim 15 wherein said second faces of said block provide opposed side wall surfaces of a channel for the flow of liquid outwardly through said exit aperture, each of which second faces has an optically flat finish.

17. A dye laser comprising;
  A. an optical resonator structure;
  B. means for providing a liquid dye capable of lasing at a selected location contiguous to said structure, which means includes a nozzle for receiving a lasable liquid dye under pressure and forming a free jet stream therefrom having a channel for the flow of liquid therethrough outwardly through an exit aperture, said channel having opposed side wall surfaces which individually have an optically flat finish;
  C. means for focusing to said selected location, a beam of pumping radiation capable of creating a population inversion in said dye; and
  D. means mounted on said optical resonator structure positioning a pair of optical reflectors respectively on opposite sides of said location to reflect optical radiation emitted by said liquid dye.

18. A dye laser according to claim 17 wherein each of said side wall surfaces of said nozzle intersects another face of said nozzle at said exit aperture to define an edge for said exit aperture, each of which edges is conditioned to have a minimum of imperfections.

19. A dye laser according to claim 17 wherein said channel is defined by at least two blocks of material respectively providing said opposed side wall surfaces.

20. A dye laser according to claim 19 wherein said channel is rectangular in cross section at said exit aperture and is formed by four blocks of material which are in optical contact with one another at all interfaces therebetween exposed to liquid flowing in said channel.

21. A dye laser according to claim 20 wherein the side wall surface for said channel provided by each of said blocks intersects another face of said block at said exit aperture to define an edge for said exit aperture, which edge is conditioned to have a minimum of imperfections.

* * * * *